US008689126B2

(12) United States Patent
Kalaidjian (10) Patent No.: US 8,689,126 B2
(45) Date of Patent: Apr. 1, 2014

(54) DISPLAYING GRAPHICAL INDICATIONS TO INDICATE DEPENDENCIES BETWEEN SCRIPTS

(75) Inventor: Alex Kalaidjian, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 174 days.

(21) Appl. No.: 12/822,536

(22) Filed: Jun. 24, 2010

(65) Prior Publication Data

US 2014/0006991 A1    Jan. 2, 2014

(51) Int. Cl.
*G06F 3/048* (2013.01)
*G06F 3/00* (2006.01)

(52) U.S. Cl.
USPC ............ 715/771; 715/762; 715/763; 715/764

(58) Field of Classification Search
USPC .................. 715/771, 762, 763, 764
See application file for complete search history.

(56) References Cited

U.S. PATENT DOCUMENTS

| 5,745,712 | A  | * | 4/1998 | Turpin et al. ............... 715/763 |
| 6,057,837 | A  | * | 5/2000 | Hatakeda et al. ............ 715/765 |
| 6,792,595 | B1 | * | 9/2004 | Storistenau et al. .......... 717/110 |
| 7,206,997 | B2 |   | 4/2007 | Alden et al. |
| 2004/0034662 | A1 | * | 2/2004 | Austin et al. ............... 707/104.1 |
| 2004/0056904 | A1 | * | 3/2004 | Jaeger ............................ 345/853 |
| 2004/0230636 | A1 | * | 11/2004 | Masuoka et al. .............. 708/800 |
| 2006/0080594 | A1 |   | 4/2006 | Chavoustie et al. |
| 2007/0150838 | A1 | * | 6/2007 | Moser .......................... 715/822 |
| 2007/0288867 | A1 | * | 12/2007 | Gunturi et al. ................ 715/825 |

OTHER PUBLICATIONS

Ron Person; Special Edition Using Microsoft Excel 97; Dec. 17, 1996; Que Publishing; pp. 769-771.*

* cited by examiner

*Primary Examiner* — Doug Hutton, Jr.
*Assistant Examiner* — Li Sun
(74) *Attorney, Agent, or Firm* — Kilpatrick Townsend & Stockton LLP (57) ABSTRACT

Systems and methods for displaying graphical indications to indicate dependencies between scripts are disclosed. For example, a computer-implemented method is used to identify script dependencies between form objects. The form objects are part of a form created in a form design application. The form can be used by a user in a form rendering application. The computer-implemented method includes identifying with a processing device a script that performs a function. The method also includes determining with the processing device references in the script to plural form objects. The method further includes flagging the plural form objects corresponding to the references as related form objects. The method additionally includes rendering on a display device a graphical indication of the related form objects.

19 Claims, 9 Drawing Sheets

DISPLAYING GRAPHICAL INDICATIONS TO INDICATE DEPENDENCIES BETWEEN SCRIPTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Forms provide a convenient way for users to input data or interact with objects. Forms are generally created in a design application, for example ADOBE® ACROBAT® or ADOBE® LIVECYCLE® Designer, by a designer. When a user later wishes to use a form, the user renders the form in a reader application, for example ADOBE® ACROBAT® READER®. For example, a designer may design a form to be hosted on a website to allow a user to place a purchase order or to accomplish a workflow. The designer would create the form in a design application, then the form will be rendered by a reader application for use by a user. The reader application permits the user to use the form, such as to fill in fields, but limits the users ability to change the form. The form may include objects such as fields to be filled out by the user (e.g., billing information, delivery information, items to be purchased, etc.), objects that auto-fill in response to fields filled out by the user (e.g., calculations of total, tax, shipping, etc.), and objects that perform other actions (e.g., a button that submits the form to a backend database or emails the form to a merchant's email address). Forms provide a desirable user interface ("UI") for many reasons.

Forms can also provide diverse and dynamic objects. For example, a form may include conventional objects, such as fields for user input and graphics for display to a user, and may also include more dynamic objects, such as buttons or controls. Forms may have associated scripts (e.g., JAVASCRIPT® scripts) that perform functions, such as importing data, populating fields, or performing other actions. Additionally, a designer of a form may secure the form, for example by encrypting the form using special features of a design application.

Conventional design applications have a portion of their UI configured for displaying to a user a "design view" of the form. The design view allows the designer to create the layout of a form and create or manipulate objects on the form. For example, a design view may show where objects, for example text fields or buttons, would appear on a completed form. The design view differs from the rendered view of a form in that the design view allows a designer to manipulate objects as the designer designs the form. For example, a designer may add objects, remove objects, move or modify the shape of objects, or modify how a user can interact with objects of a completed form. Once the form is rendered, a user may only interact with the form and may not modify objects on the form.

To create a useful form with even a moderate amount of functionality, the designer of the form writes scripts that may depend on one or more objects on a form and/or be activated by a user interacting with one or more objects on a form. Scripts add functionality to particular objects on a form, for example a script could be configured to change the background color of a field to red to indicate that its current value is invalid. Scripts can also work with multiple objects within a form, for example summing values of several fields and displaying the total in another field or emailing a form to an email address a user provided in a field. Scripts in a form can be executed in any number of ways, for example a script may be activated by an activation form object (e.g. a button) when clicked on by a user.

A designer generally writes and modifies scripts in a "script editor". The script editor is generally viewed in a separate portion of the design program UI, for example in a pop-up window. For a designer to view the contents of a script (i.e., the code), the script editor must necessarily usurp real-estate from the design view (i.e., take away valuable screen space from the design view), thereby restricting the designer's view to a limited portion of the form or to a zoomed-out view of the form. The script editor also takes away space from any other windows that may be open, for example a window showing properties of an object.

Scripts often contain references to one or more form objects and are said to be dependent on those form objects. For example, if a "tax" field displays and calculates the amount of tax on a payment based on the value of a "rate" field that contains the tax rate as well as the value of a "payment" field that contains the payment amount, the script that calculates the "tax" field is said to be dependent on the "rate" and "payment" fields. Identifying and understanding dependencies between scripts is integral in building a form with even a moderate amount of functionality and complexity. The difficulty in identifying dependencies increases exponentially as a form becomes more complex and scripts depend on more and more form objects that span across multiple pages. For a designer to look through all scripts related to a form in the script editor to determine which objects each depends on is a very cumbersome task. This task of going through each script to determine dependencies is especially difficult for a designer who did not initially create the form but has been tasked with maintaining or updating it with new functionality.

Prior art systems, for example the system disclosed in U.S. Pat. No. 7,206,997 to Alden et al., teach that a functional visualization of a spreadsheet can allow users to visualize the relationship between cells of a spreadsheet. The system of Alden teaches generating an influence diagram with entities representing the cells of a spreadsheet, the influence diagram having arcs (e.g., arrows) connecting the entities corresponding to equations that may be entered in the cells. While this solution provides users with a visual representation of the relationship between cells, this method perpetuates the inconvenience of the script editor in that a portion of the UI must be used to display the influence diagram. Indeed, an influence diagram could be generated to visualize the functional relationship of objects on a form but at the cost of UI real estate.

The prior art system disclosed in U.S. Patent Application Publication 2006/0080594 of Chavoustie et al. teaches a different approach to providing a visualization of the relationship between cells on a spreadsheet. The system of Chavoustie provides labels in cells of a spreadsheet and graphical path lines between cells of a spreadsheet to show how equations relate cells of a spreadsheet. This approach overlays the functional visualization of the relationship between spreadsheet cells directly on a spreadsheet.

Forms are fundamentally different from spreadsheets. While spreadsheets arrange cells based on their relation, forms provide a completely free layout of objects and scripts may relate plural objects on a form. A designer of a spreadsheet chooses cell location based on the functional relationship of rows and columns while a designer of a form chooses object location based on convenience to a user of the form.

Thus, a designer of a spreadsheet may understand the relationship of cells on the spreadsheet by their mere position, but designer of a form only deduces the relationship of objects by reviewing scripts that refer to the objects. Indeed, the full details of a cell's relationship to other cells are provided directly by the equation in the cell, while the functional relationship of a form object may be buried in several long and complex scripts.

Moreover, form objects are often related in ways other than through equations that cannot be effectively shown on a spreadsheet or even an influence diagram. Neither can show, for example, UI functions performed by form objects (e.g., an activation form object activating one or more scripts in response to a user action). For example, neither a spreadsheet, even with indications of cell relationships, nor an influence diagram can show the functional relationship a script may provide having a first UI control perform a function that may depend on one or more other form objects or a function that is modified based on a UI control.

Further, forms are also fundamentally different from spreadsheets in that they are designed in a design application and then used in a rendering application. The teachings of both Alden and Chavoustie may assist a designer or user of a spreadsheet with understanding and modifying equations in cells. However, these teachings provide almost no benefit to the designer of a form who must create and modify scripts. Additionally, these teachings not only provide no benefit to the user of a form, but would hinder a user's use of a form. A goal of forms is to provide a convenient interface for a user while completely hiding underlying operations from the user.

As scripts become more complicated they can easily grow to be thousands of lines and a single script can be dependent on many objects in complex ways. For example, scripts for performing dynamic actions, such as populating a drop-down-list object with data based on a user's input into other form objects or importing data from a file into a form, may be thousands of lines and may depend on hundreds of form objects. Accordingly, it is often difficult or cumbersome to troubleshoot and edit forms.

SUMMARY

According to an aspect of the invention, a computer-implemented method for identifying script dependencies between form objects, the form objects being part of a form created in a form design application, the form being configured for use by a user in a form rendering application, the method including identifying with a processing device a script that performs a function, determining with the processing device references in the script to plural form objects, flagging the plural form objects corresponding to the references as related form objects; and rendering on a display device a graphical indication of the related form objects.

According to an aspect of the invention, a computing device includes a processor executing instructions to provide a graphical user interface displayed on a display device and for facilitating design of a form in a design application, the form being configured for use by a user in a form rendering application, the user interface including a plurality of form objects arranged on the form displayed on a display device; and one or more graphical indications of references in a script to one or more of related form objects displayed on a display device.

While the system and method is described herein by way of example and embodiments, those skilled in the art will recognize that the design application UI and method is not limited to the embodiments or drawings described. It should be understood that the drawings and description are not intended to limit embodiments to the particular form disclosed. Rather, the intention is to cover all modifications, equivalents and alternatives falling within the spirit and scope of the invention defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Disclosed embodiments provide an intuitive and interactive visualization of script dependencies between form objects in a design application's user interface ("UI"). In a "design view" of a form, graphical indications of script dependencies display between form objects. Additionally, in response to a user (i.e., a user of the design application, such as a designer) selecting a graphical indication of script dependencies, at least a portion of the script associated with the graphical indication may be highlighted and displayed to the user.

Figure 1:
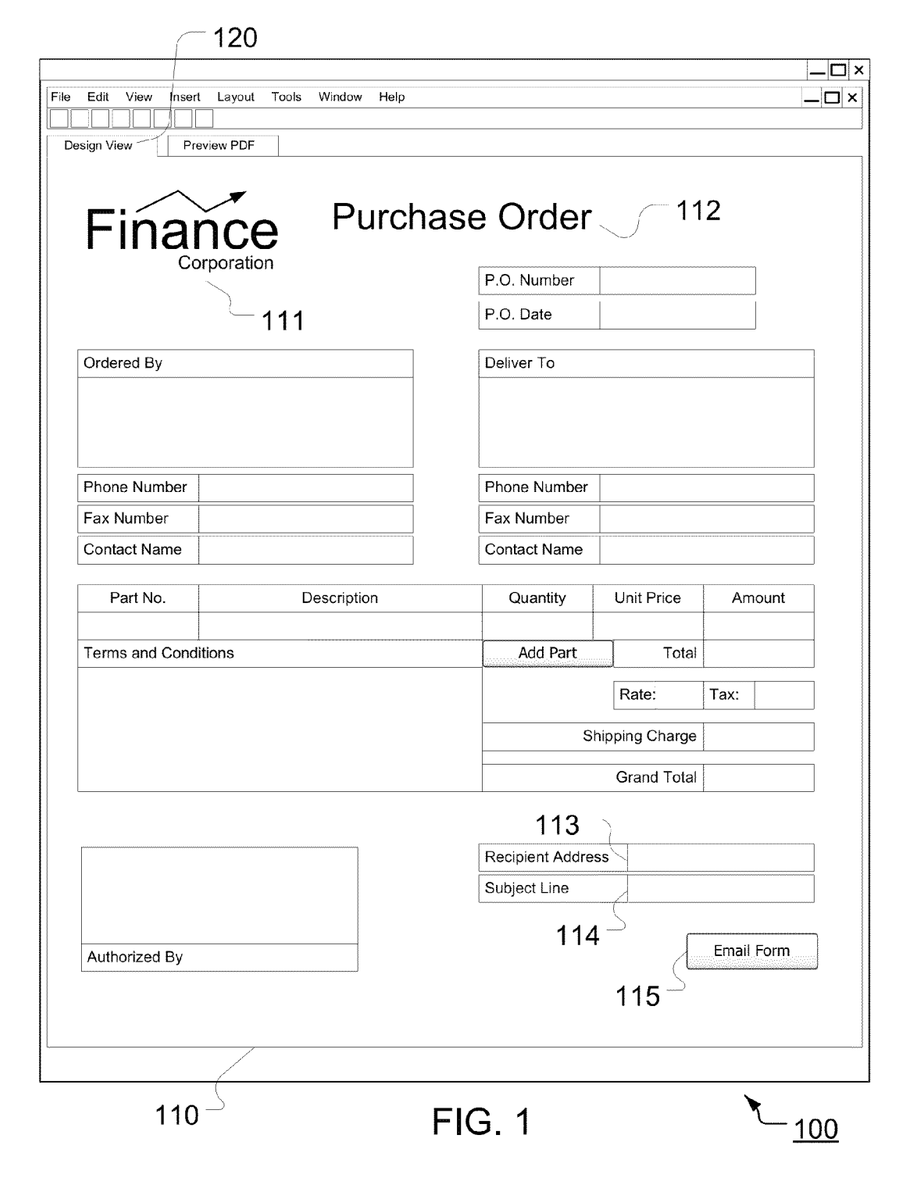
FIG. 1 illustrates an exemplary design view of a form in a design application UI.

FIG. 1 illustrates a design view of a form 110 in a design application UI 100. A conventional form generally includes a plurality of objects arranged thereon. For example, form 110 includes a graphic 111, text box 112, a plurality of fields, such as recipient address field 113 and subject line field 114, and email form button 115. Of course these are only exemplary objects and one of ordinary skill in the art understands many other objects may be arranged on a form. In design application UI 100, a user designs a form. For example, the user may add additional objects, delete objects, resize objects, modify the layout of objects, and create or modify scripts.

The user may modify the layout of a form (e.g., add objects, delete objects, resize objects, etc.) by directly interacting with form objects in a design view 120. For example, to move an object on form 110 the user may select the object with a mouse pointer (not shown) and drag-and-drop the object to a new location or resize an object by dragging-and-dropping a resize handle of an object. The user may also modify the layout of form 110 in ways other than pointing and clicking with a mouse, such as by interacting with menus or keyboard shortcuts. For example, the user may hit a keyboard shortcut to insert a new object. Of course, the user may interact with design application UI 100 via any computing input device.

Figure 2:
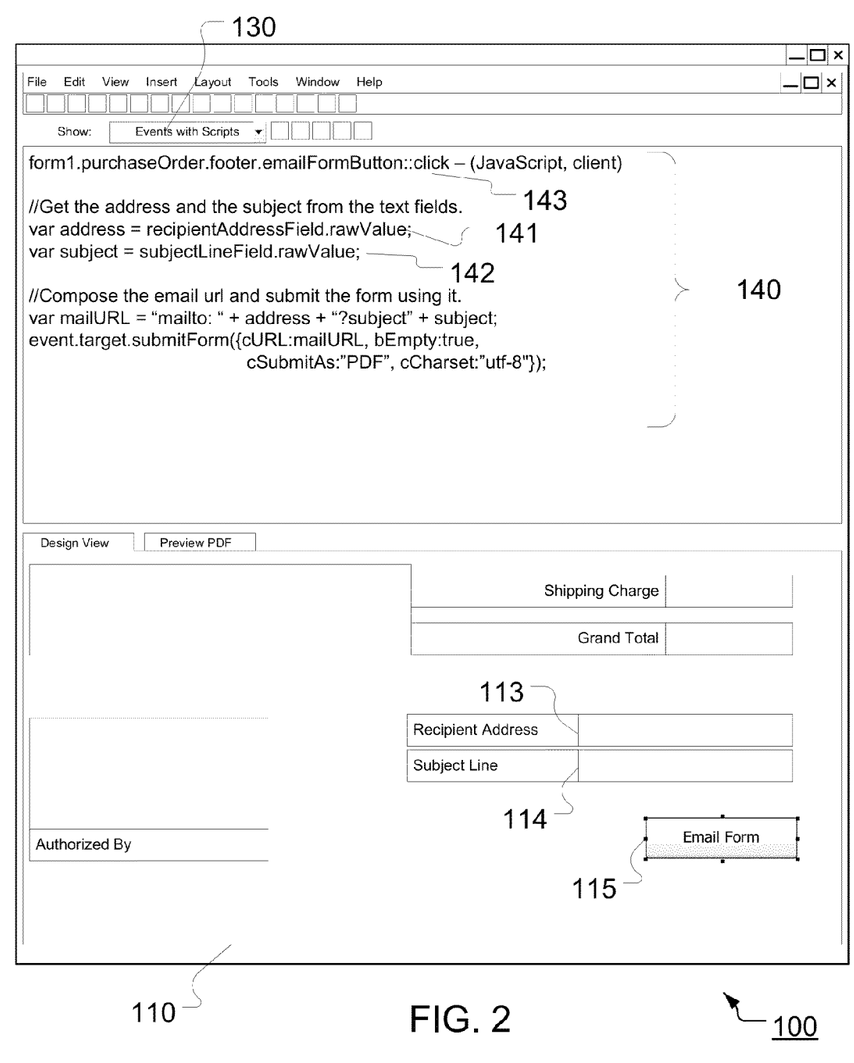
FIG. 2 illustrates an exemplary script editor window displaying a script depending on form objects in a design application UI.

To interact with a script associated with a form, the user currently must open the script for viewing and/or editing, for example in a script editor window. FIG. 2 illustrates a script editor window 130 displaying a script associated with email form button 115. Script editor window 130 inconveniently occupies a large amount of design application UI 100, thereby allowing a user to view less of form 110.

Script window 130 displays a script associated with an object. In FIG. 2, script window 130 displays script 140 associated with email form button 115 (i.e., on the event emailFormButton::click, rendered form 110 will execute script 140). A user of design application UI 100 may read and/or modify script 140 in script window 130. To determine what objects a script depends on, the user must read or at least scan through the entire script for references to one or more objects. For example, to determine that script 140 is activated by email form button 115 (i.e., an activation form object) the user must read line 143, to determine it depends on recipient address field 113 the user must read script line 141, and to determine it depends on subject line field 114 the user must read script line 142. Thus, for the user to determine which scripts are associated with an object (i.e., are triggered by or depend on), the user must open every script associated with a form and read through, or at least scan through, the contents of each script. Additionally, while script 140 is relatively simple, more complex scripts may be thousands of lines, creating a cumbersome task for the user to determine dependencies.

Figure 3:
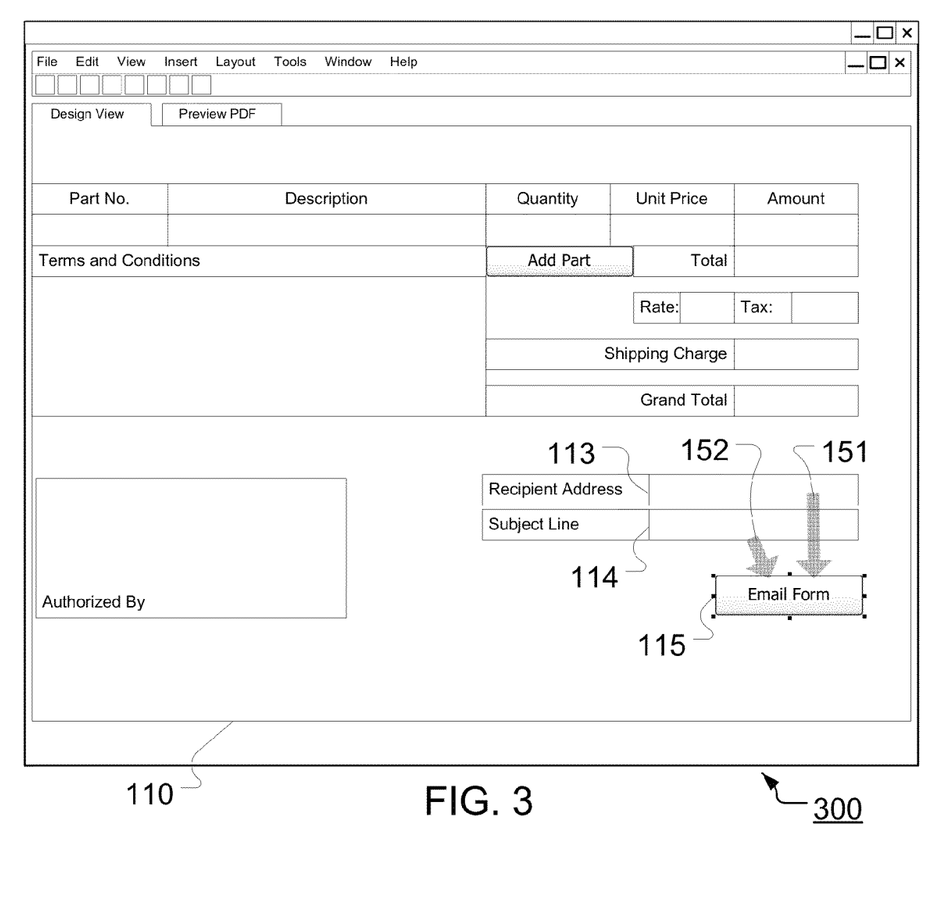
FIG. 3 illustrates an exemplary design application UI having graphical indications showing script dependencies.

FIG. 3 illustrates an exemplary design application UI 300 having graphical indications rendered between an activation form object and related form objects. Design application UI 300 displays arrows 151 and 152 between form objects. Arrow 151 begins at recipient address field 113 and extends to (i.e., points to) email form button 115. Email form button 115 may be referred to as an activation form object because script 140 is activated when a user interacts with email form button 115. Arrow 151 allows the user of design application UI 300 to recognize with a mere glance that a user of the rendered form activates script 140 (shown in FIG. 2) by selecting email form button 115 and that script 140 depends on recipient address field 113. In like fashion, arrow 152 begins at subject line field object 114 and extends to email form button 115. Hence, arrow 152 shows the user of design application UI 300 that script 140 (shown in FIG. 2) is activated by a user of the rendered form selecting email form button 115 and that script 140 depends on subject line field 114.

Arrows 151 and 152 may be displayed when the user of design application UI 300 selects email form button 115, thereby allowing the user to instantly view the objects on which the script 140 activated by email form button 115 depends. Alternatively, arrows 151 and 152 may be always visible, the user may have a control to toggle on and off the display of arrows 151 and 152, arrows 151 and 152 may display when the user moves a mouse pointer over email form button 115, arrows 151 and 152 may display in response to a "hotkey" (i.e., a keyboard short-cut), or they may appear in response to any other trigger.

Alternatively, arrows showing script dependencies may be displayed when an object on which the script depends is selected. For example, if recipient address field 113 is selected by the user, arrow 151 may be displayed pointing at email form button object 115. This would show that script 140 activated by email form button 115 depends on recipient address field 113. In this case, arrow 152 may not be displayed.

FIG. 3 displays arrows 151 and 152 to illustrate script dependencies because arrows are a particularly clear tool for illustrating which object activates a script and objects on which that script depends. The arrows shown in FIG. 3 appear partially transparent (e.g., 30% transparent) to allow the user to clearly see underlying form objects. However, other embodiments may include arrows that have greater or lesser transparency (including arrows not transparent at all), arrows displayed as only outlines, arrows displayed as lines, or any other form of arrow. The arrows may additionally be any color, pattern, or arrow shape (e.g., a spade end, a triangular end (as shown), or any other end).

Of course, any graphical indication of script dependencies may be used. For example, a wedge shape or a line could extend from a first form object to a second form object, thereby showing that a script is activated by the second form object depends on the first form object. Alternatively, a first form object that activates a script may have a first marker, such as a shape of a certain color, displayed on or in proximity to the first form object and a second form object that the script depends on may have a second marker, such as a shape of a separate color, displayed on or in proximity to the second form object. In still other embodiments, the direction of the graphical indication of dependencies may be reversed, and an arrow or other form of graphical indication may point from the object that activates a script to an object on which the script depends.

While FIG. 3 shows graphical indications rendered between email form button 115 and related form objects recipient address field 113 and subject line field object 114, embodiments of a design application UI may show graphical indications between any activation form object and related form objects. For example, for a script activated when a user enters a username and password to check the validity of a user's password in conjunction with an entered username, graphical indicators may be rendered between the username and password fields. Other activation form objects may include a script activated when a user signs a form with a digital signature to verify the validity of a certificate associated with the digital signature, a script to encode the data entered into the rest of the form into a barcode on the form activated by a user selecting an activation form object to trigger the script, or a script that invokes a web service to acquire data, for example the current weather or sports scores, to populate appropriate fields on a form activated by a user selecting an activation form object.

Figure 4:
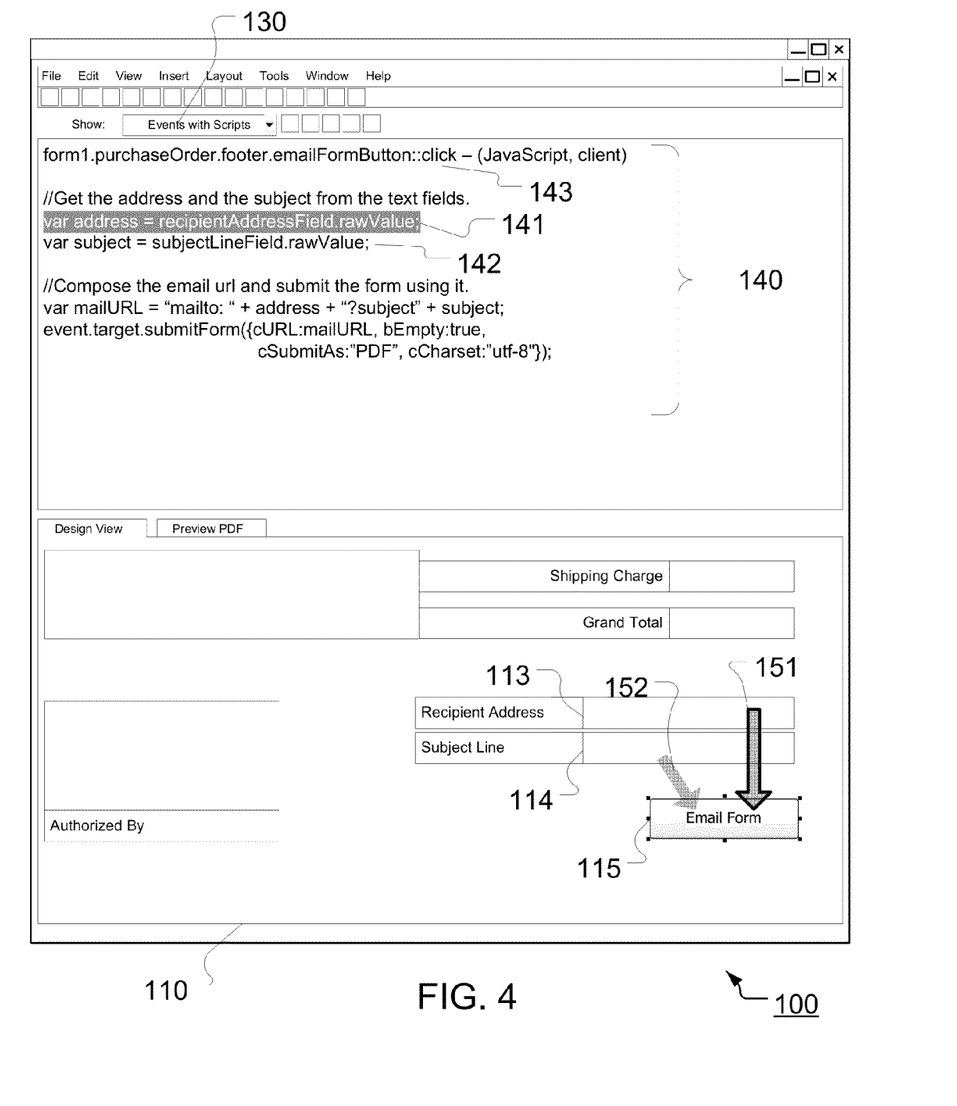
FIG. 4 illustrates an exemplary design application UI having a graphical indication showing a script dependency selected.

Embodiments of a design application UI may automatically open a script editor and display a script associated with an arrow and indicate the specific portion of the script where the dependency is found in response to a user selecting an arrow. For example, FIG. 4 illustrates how design application UI 300 responds to the user selecting arrow 151 (selection indicated by the bold outline of arrow 151) extending from recipient address field 113 to email form button 115. In response to the user's selection of arrow 151, design application UI 300 shows script 140 and automatically highlights line 141 of script 140 because line 141 is activated when email form button 115 is clicked and refers to recipient address 113. This allows the user to quickly identify the line of the script where the dependency is located, thereby saving the user from having to read or scan up to thousands of lines of a complex script to locate a dependency. Of course, the term "highlight" as used herein refers to any way of accentuating the text of the script, for example bolding, italicizing, coloring, or adjusting any other text or font property.

The bold outline of arrow 151 is not just for illustrative purposes but may be displayed to the user of design application UI 300 to allow the user to quickly recognize that arrow 151 is selected. Of course, in other embodiments selecting an arrow may show the script and highlight the line in the script showing the dependency without placing a bold outline around the arrow. Additionally, selecting an arrow may provide a graphical indication that the arrow is selected other than an outline, such as varying the size, color, transparency, shape, or any other property of the arrow.

Script 140 is a relatively simple script, depending on only two form objects. Alternative scripts, however, may be thousands of lines and depend from hundreds or more form objects. Such scripts may depend on a form object in multiple, non-consecutive lines. In such instances, embodiments may display a plurality of script editor windows or a single script editor window "split" to show each instance that a script depends on the object the selected arrow points from. In other embodiments, only the first instance that a script depends on the object may be highlighted, but a control, such as a "next" button or a keyboard shortcut, may allow a developer to view other portions of the script where the script depends on the object the selected arrow points from.

Figure 5:
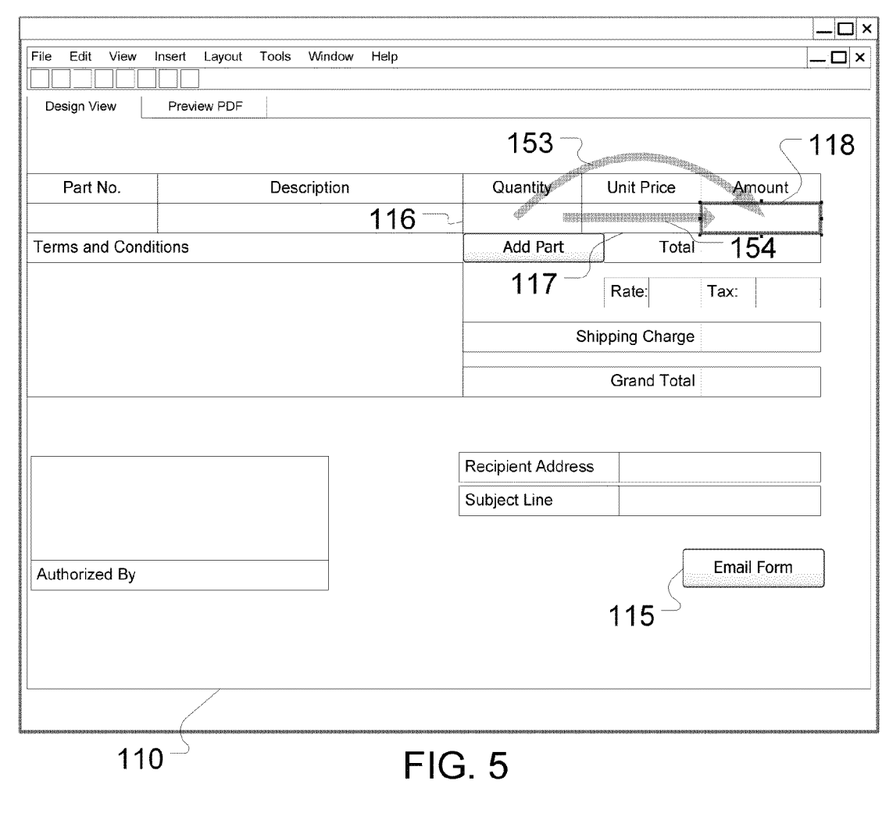
FIG. 5 illustrates an exemplary design application UI having non-crossing graphical indications showing script dependencies.

Referring to FIG. 5, form 110 includes an amount field 118. A script (not shown) associated with amount field 118 depends on quantity field 116 and unit price field 117. The script is configured to auto-fill amount field 118 of the rendered form with the product of the value the user enters in quantity field 116 and the value a user enters in unit price field 117. Because amount field 118 is selected in design application UI 300 (selection being indicated by the visible resize handles on amount field 118), arrow 153 extends from quantity field 116 and points to amount field 118 and arrow 154 extends from unit price field 117 and points to amount field 118. Thus, at a glance the user can recognize that the script refers to plural objects and that script that auto-fills amount field 118 depends on both quantity field 116 and unit price 117.

Because quantity field 116, unit price field 117 and amount field 118 are all arranged linearly, an arrow extending from quantity field 116 to amount field 118 and an arrow extending from unit price field 117 to amount field 118 would typically overlap. Embodiments of design application UIs, however, may configure arrows to be displayed to the user to be directed (e.g., curved) around each other to improve clarity. FIG. 5 shows arrow 154 as a straight arrow directed from unit price field 117 to amount field 118 because unit price field 117 is closer to amount field 118 than quantity field 116. Of course, a straight arrow may be displayed between the furthest apart related objects that the script depends upon and the other dependencies may be displayed by curved arrows. Additionally, while FIG. 5 shows straight arrow 154 and curved arrow 153, other arrows could have rigid bends, multiple curves, or any other shape to indicate dependency between objects. Additionally, in alternative embodiments all arrows may be straight, curved, or any other shape. Further, if a script depends on several objects and requires arrows to overlap to extend between related objects, arrows may cross in a fashion such that a user can easily visually recognize dependencies. For example, one arrow may include a "hump" to show where it "jumps" over another arrow. In other embodiments, each of a plurality of arrows showing relation between objects that a script depends on could be a different color, could have a different pattern (e.g., solid, dotted, dashed, intermittent dot-dash, etc.), or could provide any other graphical indication of differentiation.

Figure 6:
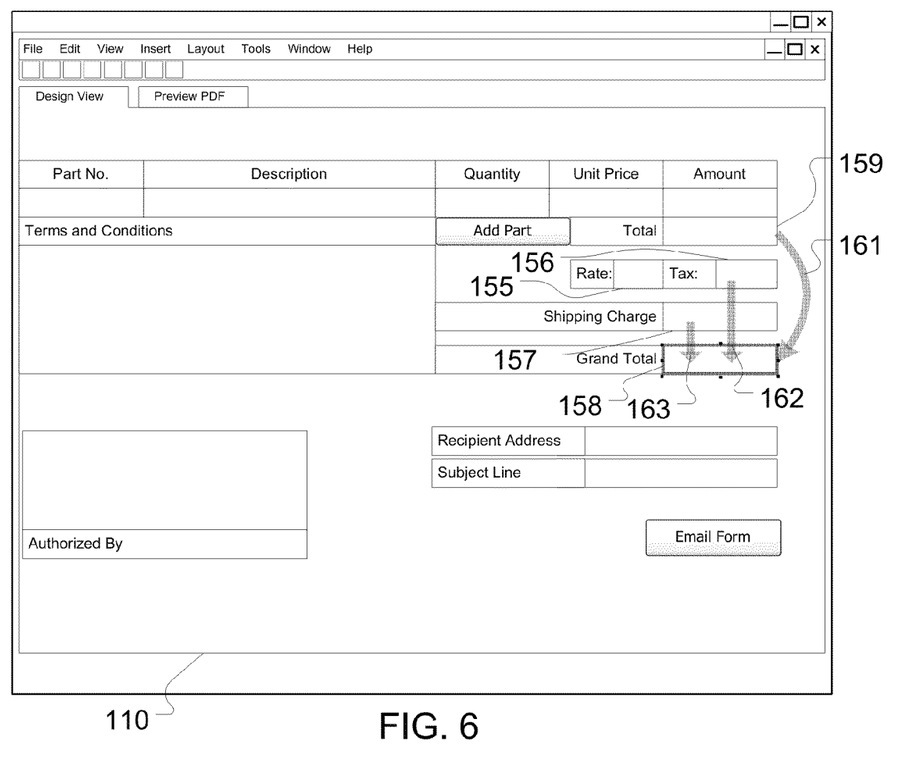
FIG. 6 illustrates an exemplary design application UI having non-crossing graphical indications showing script dependencies.

Referring to FIG. 6, design application UI 300 is shown after the user selects grand total field 158 on form 110. A script (not shown) may automatically generate and populate grand total field 158 with the sum of the value automatically generated in total field 159 (which in turn depends on amount field 118), the value automatically generated in tax field 156 (which in turn depends on rate field 155 and total field 159), and shipping charge field 157 (which may depend from one or more other objects). Thus, the script depends on, and grand total field 158 is related to, total field 159, tax field 156, and shipping charge field 157 and these dependencies and relations are shown by arrows 161, 162 and 163 respectively.

In the embodiment shown, arrows 162 and 163 are straight arrows extending vertically from tax field 156 and shipping charge field 157 to grand total field 158. Because of the layout arrangement of form 110, this can be done without arrows 162 and 163 overlapping or being confusingly near each other. Additionally, arrow 161 extends from total field 159 to grand total field 158 in a curved fashion to clearly differentiate each of the script dependencies. Due to the orientation of each of the fields, in alternative embodiments all three arrows may be arranged nearer to each other in a non-overlapping fashion or in any other arrangement.

Figure 7:
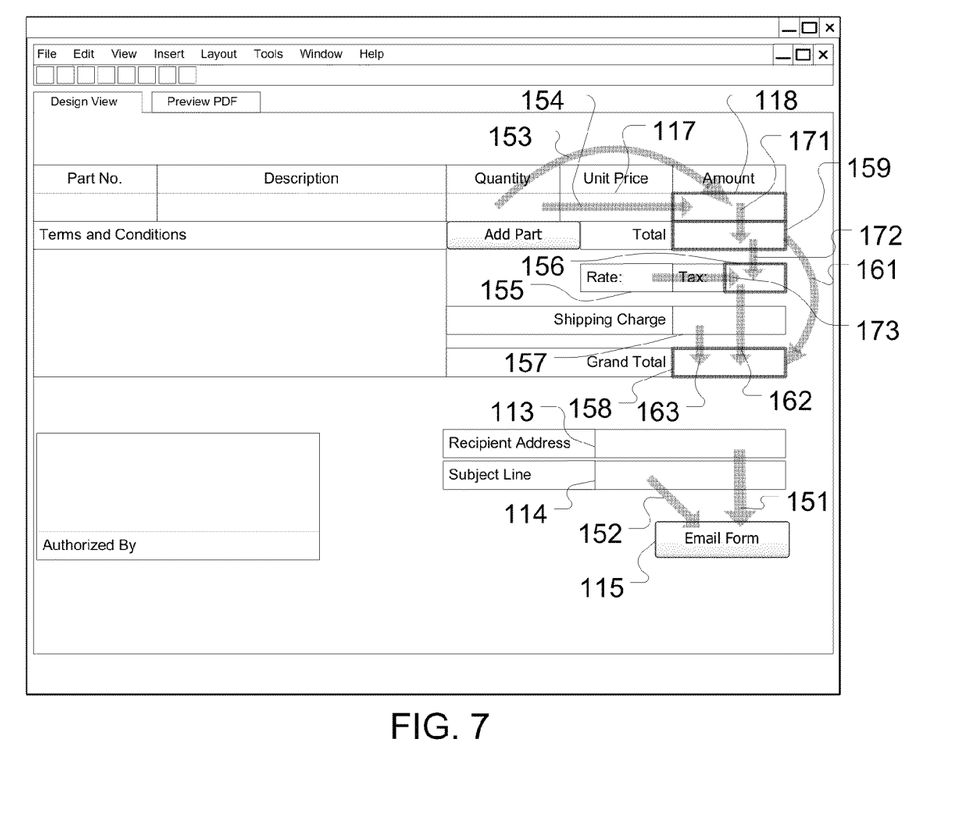
FIG. 7 illustrates an exemplary design application UI having graphical indications showing all script dependencies on a form.

Referring to FIG. 7, design application UI 300 may simultaneously display to the user arrows indicating all script dependencies on a form. For example, design application UI 300 may display this view when no object is selected, when the user selects an option (e.g., a toolbar button or menu option) to show all dependencies, when the user presses a hotkey, or in response to any other user control. When design application UI 300 simultaneously displays arrows indicating all script dependencies on a form, plural object related via a script may be highlighted in a certain color and arrows showing the relationship of the plural objects may be of the same color. For example, grand total field 158 may be highlighted (e.g., outlined, shaded, the text label may become the color, etc.) green and arrows 161, 162, 163 may likewise be highlighted the same shade of green to indicate that a script that auto-fills grand total field 158 depends on total field 159, tax field 156 and shipping charge field 157 respectively. Additionally, to differentiate dependencies, another object, such as tax field 156, may be highlighted a different color and may have arrows indicating related form objects highlighted the same color. For example, tax field 156 may be highlighted red and arrows 172 and 173 may be highlighted red to show that tax field 173 relates to total field 159 and rate field 155.

Alternative embodiments may differentiate dependencies upon different objects in alternative fashions other than differing colors. For example, arrows could have different shapes, patterns, or other properties to differentiate the objects a script depends on. Still, in other embodiments all arrows may be the same shade and color, as shown in FIG. 7. Because the arrows may be configured to not cross or overlap, such as arrow 161 curving around arrows 172 and 162, arrows displayed in the same color may still clearly indicate script dependencies to a user of design application UI 300.

According to other embodiments, the configuration of arrows may adjust depending on the zoom level with which a designer views a form. For example, when a user is zoomed in fairly close to field objects, as shown in FIG. 7, arrows between objects in the same proximity may be able to run parallel to each other while still clearly indicating dependencies to the user. Arrows 162 and 163, for example, are shown extending in parallel toward grand total field 158. However, when a user zooms out further from field objects, as shown in FIG. 7, the design application UI 300 may be configured to re-route arrows, such as by curving arrows, to provide a degree of separation between arrows to allow the user to clearly understand dependencies.

While the above embodiments only describe arrows that point from a first object to a second object according to a script dependency, double ended arrows may be displayed in embodiments where scripts activated by two objects each depend on each other. For example, for a form having radio button objects where only a single radio button may be selected at a time, each radio button may be related by a script to all other radio buttons so that a first radio button will automatically deselect itself if a user selects a second radio button. In such an instance, a design application UI may display to a user double ended arrows extending between each radio button object.

Figure 8:
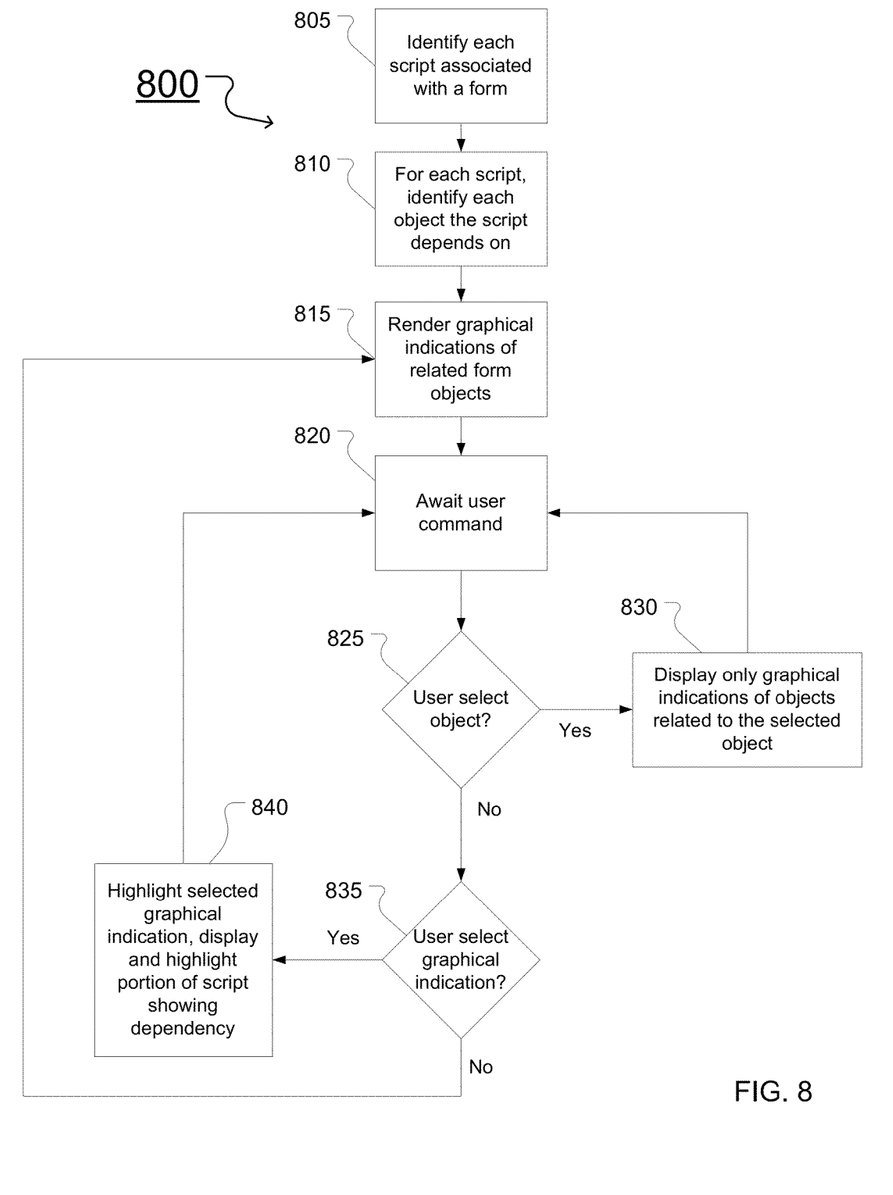
FIG. 8 is a flowchart illustrating an exemplary computer-implemented method for providing graphical indications of script dependencies to a user during design of a form in a design application.

Referring now to FIG. 8, flowchart 800 shows a computer-implemented method for providing graphical indications of script dependencies to a user during design of a form in a design application. At step 805, a processing device scans a form to identify scripts associated with objects on the form. At step 810, the processing device scans each identified script to identify and flag related form objects (e.g., an activation form object such as email form button 115 that activates the script and subject line field 114 and recipient address field 113 each associated with the script as shown in FIG. 7, or amount field 118 and related quantity field 116 and unit price field 117 also shown in FIG. 7). At step 815, the processing device configures the display of the form in the design application UI to render a graphical indication of each script dependency (i.e., a graphical indication of the relation between form objects). At step 820, the processing device awaits a command from a user received through an input device, such as a mouse or keyboard. At step 825, if the user selects an object with the input device, the process continues to step 830 and the processing device configures the display of the form in the design application UI to render graphical indications of only the selected object's relation to other form objects. After step 830, the process returns to step 820 and awaits another user command. At step 825, if the user selects anything other than an object, the process continues to step 835. At step 835, if the user selects a graphical indication of a dependency (e.g., an arrow), then the process continues to step 840. At step 840, the processing device configures the display of the form in the design application UI to render highlighting on the selected graphical indication and to display and highlight the portion of the script associated with the selected graphical indication. After step 840, the process returns to step 820 and awaits another user command. If at step 835 the user selects anything other than a graphical indication of a dependency, the process returns to step 815 and the processing device again configures the display of the form in the design application UI to render graphical indications of each script dependency (i.e., display graphical indications between all related form objects). At step 820, the processing device again awaits a user command.

It should be noted that a design application UI according to embodiments may be implemented with any type of software executed on any hardware device(s) and may be embodied in a pre-programmed general purpose computing device. For example, the design application UI may be implemented using a server, a personal computer, a portable computer, a thin client, a mobile device (e.g., cell phone, smart phone, IPOD®, etc.) or any suitable device or devices. The design application UI may be displayed on a viewing device, for example, a screen or projected display. A user may interact with the design application UI via an input device, for example a mouse, keyboard, or touch-screen.

Figure 9:
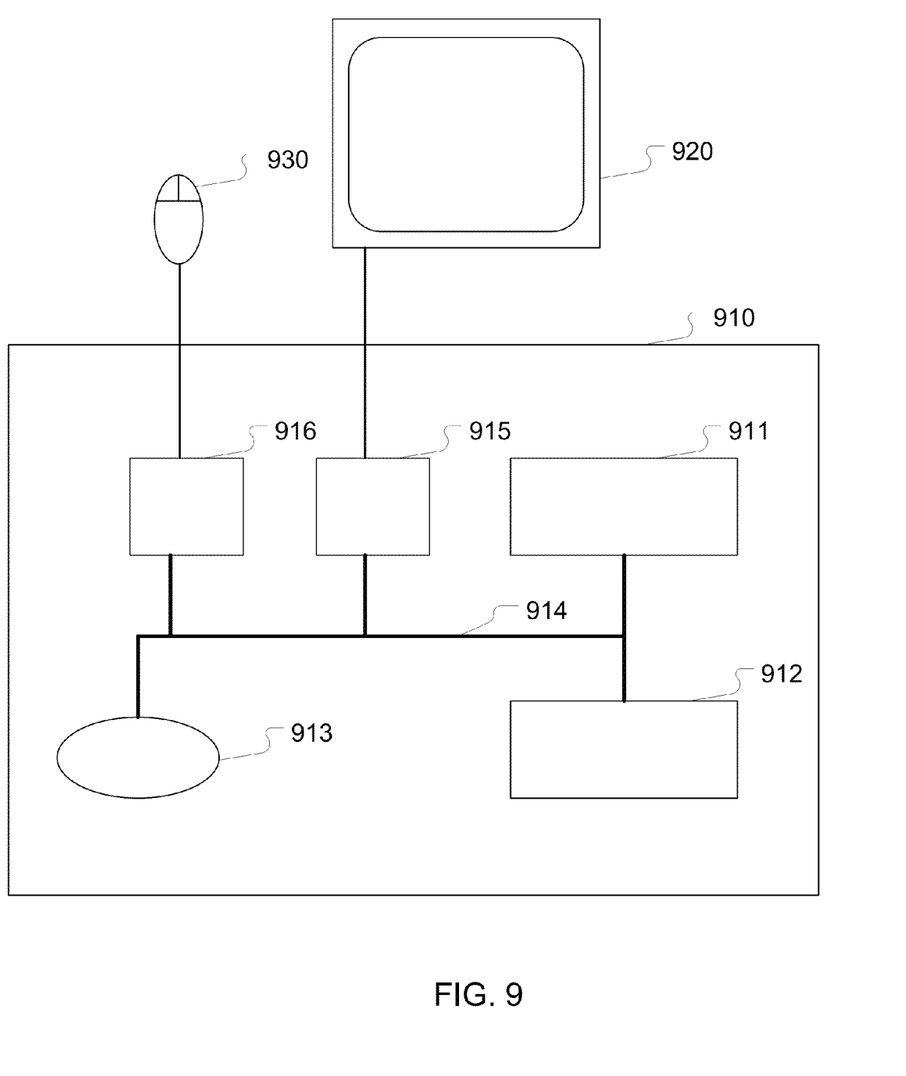
FIG. 9 illustrates an exemplary computing device for providing a design application UI to a user on a display device and for a user to interact with the design application UI through an input device.

A design application UI may be implemented with software executed on computing device 910 of FIG. 9. Computing device 910 has one or more processors 911 designed to process instructions, for example computer readable instructions stored on a storage device 913. By processing instructions, processors 911 transforms underlying objects such that graphical indications of one or more script dependencies of one or more scripts associated with a form are rendered on a display device for viewing by a user. Storage device 913 may be any type of storage device (e.g., an optical storage device, a magnetic storage device, a solid state storage device, etc.). Alternatively, instructions may be stored in remote storage devices, for example storage devices accessed over a network or the Internet. Computing device 910 additionally has memory 912, an input controller 916, and an output controller 915. A bus 914 operatively couples components of computing device 910, including processor 911, memory 912, storage device 913, input controller 916, output controller 915, and any other devices network controllers, sound controllers, etc.). Output controller 915 is operatively coupled (e.g., via a wired or wireless connection) to a display device 920 (e.g., a monitor, television, mobile device screen, etc.) in such a fashion that output controller 915 can transform the display on display device 920 (e.g., in response to modules executed). Input controller 916 is operatively coupled (e.g., via a wired or wireless connection) to input device 930 (e.g., mouse, keyboard, touch-pad, scroll-ball, etc.) in such a fashion that input can be received from a user (e.g., a user may select with input device 930 a form object or a graphical indication of a script dependency in a design application UI displayed on display device 920). Computing device 910, display device 920, and input device 930 may be separate devices (e.g., a personal computer connected by wires to a monitor and mouse), may be integrated in a single device (e.g., a mobile device with a touchscreen), or any combination of devices (e.g., a computing device operatively coupled to a touch-screen display device, a plurality of computing devices attached to a single display device and input device, etc.).

The invention has been described through embodiments. However, various modifications can be made without departing from the scope of the invention as defined by the appended claims and legal equivalents.

What is claimed is:

1. A computer-implemented method for identifying script dependencies between form objects, the form objects being part of a form created in a form design application, the form being configured for use in a form rendering application, said method comprising:

rendering on a display device a plurality of form objects arranged on a form within a software development environment, the plurality of form objects comprise at least a form button;

identifying, within the software development environment, with a processing device a script that performs a function;

determining, within the software development environment, with the processing device references in the script to the plurality of form objects;

flagging, within the software development environment, the plurality of form objects corresponding to the references as related form objects;

rendering on the display device a graphical indication of the related form objects within the software development environment, wherein the rendering of the graphical indication of the related form objects occurs when a mouse cursor is positioned over the form button and the graphical indication is at least one arrow or line; and rendering on the display device a window displaying the script having at least one line of the script associated with the related form objects distinguished upon selection of the graphical indication of related form objects.

2. The method of claim 1, further comprising receiving input through a user interface a selection of one of the related form objects and wherein the rendering step comprises rendering a graphical indication of the remaining related form objects.

3. The method of claim 1, wherein the graphical indication is at least one arrow.

4. The method of claim 3, wherein at least one arrow is curved.

5. The method of claim 1, wherein the graphical indication is a plurality of arrows, and wherein each of the plurality of arrows is rendered such that it does not contact any other arrow.

6. The method of claim 1, further comprising:
receiving input through a user interface a selection of the graphical indication of the related form objects; and
rendering on the display device a window displaying the script having a line of the script associated with the related form objects highlighted.

7. A computer-implemented method for identifying script dependencies between form objects, said method comprising:
rendering on a display device a plurality of form objects arranged on a form within a software development environment, the plurality of form objects comprise at least one activation form object;
identifying, within the software development environment, with a processing device a script activated by the at least one activation form object;
determining, within the software development environment, with the processing device references in the script to the activation form object that activates the script when selected through a user interface and at least one other form object that is associated with the script;
flagging, within the software development environment, the activation form object and the other form objects corresponding to the references as related form objects;
rendering on the display device a graphical indication of the related form objects within the software development environment, wherein the rendering of the graphical indication of the related form objects occurs when a mouse cursor is positioned over the activation form object and the graphical indication is at least one arrow or line; and
rendering on the display device a window displaying the script having at least one line of the script associated with the related form objects distinguished upon selection of the graphical indication of related form objects.

8. The method of claim 7, further comprising receiving input through a user interface a selection of one of the related objects and wherein the rendering step comprises rendering a graphical indication of the remaining related form objects.

9. The method of claim 7, wherein the graphical indication is at least one arrow.

10. The method of claim 7, further comprising:
receiving input through a user interface a selection of the graphical indication of the related form objects; and
rendering on the display device a window displaying the script having a line of the script associated with the related form objects highlighted.

11. A computer-implemented method for identifying script dependencies between form objects, the form objects being part of a form created in a form design application, the form being configured for use in a form rendering application, said method comprising:
rendering on a display device a plurality of form objects arranged on a form within a software development environment, the plurality of form objects comprise at least a form button;
identifying, within the software development environment, with a processing device a plurality of scripts associated with the form;
determining, within the software development environment, with the processing device references in each identified script to the plurality of form objects;
flagging, within the software development environment, the plurality of form objects corresponding to the references as related form objects;
rendering on the display device a graphical indication of the related form objects within the software development environment, wherein the rendering of the graphical indication of the related form objects occurs when a mouse cursor is positioned over the form button and the graphical indication is at least one arrow or line; and
rendering on the display device a window displaying the identified script having at least one line of the script associated with the related form objects distinguished upon selection of the graphical indication of related form objects.

12. Computer readable instructions stored on a non-transitory storage device, the computer readable instructions configured to be processed by a processor to cause the processor to perform a method comprising:
rendering on a display device a plurality of form objects arranged on a form within a software development environment, the plurality of form objects comprise at least a form button;
identifying, within the software development environment, with a processing device a script that performs a function;
determining, within the software development environment, with the processing device references in the script to the plurality of form objects;
flagging, within the software development environment, the plurality of form objects corresponding to the references as related form objects;
rendering on the display device a graphical indication of the related form objects within the software development environment, wherein the rendering of the graphical indication of the related form objects occurs when a mouse cursor is positioned over the form button and the graphical indication is at least one arrow or line; and
rendering on the display device a window displaying the script having at least one line of the script associated with the related form objects distinguished upon selection of the graphical indication of related form objects.

13. The computer readable instructions of claim 12, wherein the method performed further comprises receiving input through a user interface a selection of one of the related form objects and wherein the rendering step comprises rendering a graphical indication of the remaining related form objects.

14. The computer readable instructions of claim 12, wherein the graphical indication is at least one arrow.

15. The computer readable instructions of claim 12, wherein the method performed further comprises:

receiving input through a user interface a selection of the graphical indication of the related form objects; and rendering on the display device a window displaying the script having a line of the script associated with the related form objects highlighted.

16. A computing device having a processor executing instructions to provide a graphical user interface displayed on a display device and for facilitating design of a form in a design application, the form being configured for use in a form rendering application, the user interface comprising:

a plurality of form objects arranged on a form displayed on a display device within a software development environment, the plurality of form objects comprise at least a form button; and one or more graphical indications of references in a script to one or more of related form objects displayed on the display device within the software development environment, wherein positioning a mouse cursor over the form button renders the one or more graphical indications of the related form objects and the one or more graphical indication is at least one arrow or line, and wherein selection of the one or more graphical indication of the related form objects renders on the display device a window displaying the script having at least one line of the script associated with the related form objects distinguished.

17. The computing device of claim 16, wherein selection from a user input device of a related form object renders graphical indications of the remaining related form objects.

18. The computing device of claim 16, wherein the graphical indication is at least one arrow.

19. The computing device of claim 16, wherein selection through a user interface of the graphical indication of the related form objects renders on the display device a window displaying the script having a line of the script associated with the related form objects highlighted.

* * * * *